US 6,723,479 B2

(12) United States Patent
Van De Witte et al.

(10) Patent No.: US 6,723,479 B2
(45) Date of Patent: Apr. 20, 2004

(54) METHOD FOR PROVIDING A SURFACE OF AN ARTICLE WITH A DECORATION OR TEXT

(75) Inventors: Peter Van De Witte, Heerlen (NL); Johan Lub, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 09/835,898

(22) Filed: Apr. 16, 2001

(65) Prior Publication Data

US 2001/0046015 A1 Nov. 29, 2001

(30) Foreign Application Priority Data

Apr. 25, 2000 (EP) .............................. 00201480

(51) Int. Cl.$^7$ .............................. G02F 1/1335
(52) U.S. Cl. .............................. 430/20; 430/2; 430/256; 156/272.2; 156/230; 156/232; 156/240
(58) Field of Search .............................. 430/1, 2, 14, 17, 430/18, 20, 256, 260; 156/272.2, 230, 232, 240

(56) References Cited

FOREIGN PATENT DOCUMENTS

| EP | 0537668 A2 | | 4/1993 |
|---|---|---|---|
| JP | 63-107585 A | * | 5/1988 |
| JP | 2-136292 A | * | 5/1990 |
| JP | 8-304626 A | * | 11/1996 |
| WO | WO 9714739 | | 10/1996 |

OTHER PUBLICATIONS

Database WPI, Section Ch, Week 200137, Derwent Publications Ltd., London, GB; AN 2001–351456, XP002175872.
Database WPI, Section Ch, Week 197450, Derwent Publications Ltd., London, GB; AN 1974–86514V, XP002175873.
Database WPI, Section Ch, Week 200110, Derwent Publications Ltd., London, GB; AN 2001–084593, XP002175874.
Database WPI, Section Ch, Week 197614, Derwent Publications Ltd., London, GB; AN 1976–25730X, XP002175875.
Patent Abstracts of Japan, vol. 2000, No. 14, Mar. 2001, & JP 2000309197A(Nippon Mitsubishi Oil Corp), Nov. 2000, Abstract.
Database WPI, Section Ch, Week 197614, Derwent Publications Ltd., London, GB; AN 1976–25730X, XP002175886.

* cited by examiner

Primary Examiner—John A. McPherson

(57) ABSTRACT

The invention relates to a method of providing a decorative coating or text or the like on articles, like shavers, GSM's, cards, etc. The coating comprises a region-wise optically modified (patterned) cholesteric liquid crystalline layer, which is transferred onto a surface of the article by means of a transfer operation. The so-called in-mold decoration technique has been found to be very advantageous for the transfer of decorative (patterned) cholesteric liquid crystalline layers. In this technique the layer is (releasably) deposited on a plastic carrier foil and provided with a layer of adhesive. The assembly is inserted in an injection mold before the injection molding of polymer material starts. In this way decorative coatings (e.g. multi color images) and texts or the like can be even applied onto, non-even and slightly curved substrates.

9 Claims, No Drawings

METHOD FOR PROVIDING A SURFACE OF AN ARTICLE WITH A DECORATION OR TEXT

The invention relates to a method for providing a surface of an article with a decoration or text.

Currently, coatings with special optical properties receive much interest for decorative applications. Some of the recent consumer products like cellular phones and electric shaver models, are provided with a Iriodin (Merck)® or Chromoflare® coating. The special property of these coatings is that the color of the coating depends on the viewing angle (flip-flop effects). For instance, for normally incident light the coating appears green, while for light that reflects at high polar angles the coating can appear blueish. The Iriodin particles consist of several layers with tailored optical properties (mica particles with metaloxyde layers). The coloring effects are due to wavelength dependent interference phenomena of light reflecting on the particles. These particles have the shape of flakes and can be applied on surfaces by conventional spraycoating processes.

Cholesteric liquid crystals intrinsically have a layered structure and can also be used to obtain these effects. Currently, the use of cholesteric materials in the form of flakes is investigated.

The cholesteric flakes are obtained by casting a 5–10 micron thick layer of cholesteric materials on a supporting substrate. Subsequently, the cholesteric layer is polymerized and milled to flakes. These flakes are applied to the surface by spraycoating. If the cholesteric liquid crystals and the flakes are well-aligned they will show the desired coloring effects.

The polymerization process is required to obtain a layer that is sufficiently stable for milling and subsequent processing of the flakes. However, once the cholesteric phase is polymerized the color of the flakes cannot be modified anymore by external treatments.

Recently, it was found that it is possible to make patterns in cholesteric layers and to control region-wise the color of the reflection. This can give an attractive additional feature to the decoration possibilities of cholesteric flakes. This feature makes it possible to write patterns (logos, brand names, advertising) in the layers. However, it is difficult to combine the flake technology and the patterning technology. An object of the present invention is to provide a method of producing decorations or text and the like on a surface, which makes use of certain advantages of certain liquid crystal materials without the necessity to have these to apply in the from of flakes.

In accordance with the present invention the above object is achieved by a method for providing a decoration or text or the like wherein at least a region-wise optically modified cholesteric liquid crystalline layer ("decorative layer") is transferred onto the surface of the article in a transfer operation. A transfer operation is an operation in which a decorative layer, usually provided with an adhesive layer, is arranged in adhering relationship with, or united with, an article. Mostly, the decorative layer is transferred from a carrier, leaving the carrier behind. In cases that it is useful to protect the decorative layer, the carrier, especially if it is thin, can be applied together with the decorative layer onto the article, so that it can function as a protection of the decorative layer at its side remote from the article.

Alternatively, a protective layer which is releasably disposed on the carrier and carries the decorative layer, can be transferred together with the decorative layer in the transfer operation. The operation of transferring the decorative layer from the carrier on to the article can be carried out using per se known procedures, for example, procedures involving a stroke motion, procedures involving a rolling motion, or procedures in which the corresponding foil is introduced into an injection molding mold and then plastic material is injected therebehind to form an article, for example, the front plate of an item of equipment.

An especially advantageous embodiment of the invention is characterized in that transfer of the patterned cholesteric liquid crystalline layer to a surface of a (plastic) article is carried out in an in-mold decoration process.

In-mold decoration is a technology in which decorations are provided to the product at the end of the production line. A transfer foil comprises a decorative foil supplied on a plastic carrier foil. Using injection molding equipment a (polymer) melt is firmly pressed to the transfer foil at elevated temperature. During this process the product is formed and the transfer foil is simultaneously "glued" on the product. The technology is even capable of handling objects with non-even or (slightly) curved surfaces, like e.g. shaver products. The transfer technology appears to be suitable for application of cholesteric layers to products without the necessity to mill these layers to flakes. A further advantage of this process is that the colors are purer, the reflection is specular instead of diffuse and the viewing angle dependency is more pronounced. In contrast, during the milling and spraying of flakes the orientation of the flakes is not uniform and mixing of colors is observed.

An embodiment of a process for application of decorative foils is envisaged as follows:

(1) coating of a cholesteric layer on a plastic substrate;
(2) local modification of the cholesteric reflection band by UV exposure;
(3) curing of the cholesteric layer (e-beam, thermal);
(4) application of the cholesteric layer to the product by in-mold decoration.

The region-wise optical modification of cholesteric layers can be carried out in various manners.

It has been found in particular that there are methods by which the color of cholesteric liquid crystalline layers can be region-wise changed.

A first method is characterized by utilization of the thermochromism property (The reflection color of cholesteric materials can be made to differ by cross-linking at different temperatures).

A second, more preferred method, is characterized by the utilization of the photosensitive property (the periodicity of the cholesteric phase can be influenced, in particular by UV irradiation: when the periodicity matches the wavelength of light entering the cholesteric layer the light will be reflected). In particular this latter phenomenon can advantageously be used to produce decorations or text or the like in the layers. An extra advantage of this technique is that by using a patterned mask, e.g. a grey scale mask (a transparent sheet which has areas with different grey tints), the irradiation by UV light can be integral, so that it is not necessary to irradiate the cholesteric liquid crystal layer point by point, a technique which is needed in certain other decoration techniques.

To bring out the above effect a layer of a polymer material which has a cholesteric order, in which the axis of the molecular helix of the cholesterically ordered material is arranged transverse to the plane of the layer can be used. Such a layer can be region-wise optically modified by giving different areas a different molecular helix pitch. The latter can be realized e.g. if the layer of cholesterically ordered material comprises a quantity of a convertible compound which in its non-converted and in its converted state determines the pitch of the cholesterically ordered material to a different extent. Compounds have been found in which the above conversion can be induced by exposure to UV radiation. Patterning can be realized by performing the exposure such that the irradiation dose is different for at least two different areas of the layer. After the exposure the cholesterically ordered material of the layer is polymerized and/or crosslinked to form a polymer which by means of the inventive transfer process can be transferred to a surface of an article.

Further objects, features and advantages of the invention, which also relates to an article having transferred onto a surface of if a region-wise optically modified cholesteric liquid cristalline layer, will be apparent from the following description of an embodiment of a transfer foil for use in the method according to the invention.

A transfer foil comprises a carrier or backing film which here is preferably a polyester film of a thickness of between about 5 and 100 $\mu$m, preferably between about 15 and 50 $\mu$m.

The film carries successively the following layers which are applied in the usual process which is known per se from the production of transfer foils:

Separation (or: release) layer:

This is e.g. a layer which softens under the effect of heat and which permit the further layers to be detached or released from the carrier film. The separation layer is generally of a thickness of at most 1 $\mu$m.

Some examples are:
- a mixture of toluene (95 parts), ethanol (5 parts), ester wax (dropping point 90° C. (0.1 part);
- pressure sensitive adhesives;
- teflon.

Protective lacquer layer (optional):

This is a transparent layer of lacquer, the function of which is substantially to protect from mechanical damage the free surface of the article decorated with the foil. The protective lacquer layer must therefore be suitably resistant to mechanical effects. In the present case, by way of example, it is between 1 and 2 $\mu$m in thickness.

Cholesteric liquid cristalline layer: the process of applying this layer will be described later.

Adhesive layer:

This is an adhesive layer which is known per se in relation to transfer foils, being between about 1 and 10 $\mu$m in thickness. The adhesive layer is of such a composition that it first become adhesive or sticky when subjected to a suitable heating effect. In regard to transfer foils which are to be processed without the application of heat, the adhesive layer may also be for example an adhesive which can be activated by pressure, or a layer of a material which is permanently sticky or adhesive. It will be appreciated that in the latter case the carrier film must be provided on its side remote from the cholesteric layer with a coating, such as silicone, for preventing the adhesive layer from sticking to the carrier film, so that the transfer foil can be suitably wound up in a roll.

The adhesive layer 6 can be produced in accordance with the following composition:

| composition: | |
|---|---|
| Toluene | 15 parts |
| Acetone | 15 parts |
| Ethanol | 38 parts |
| Methyl-/n-butyl-methacrylate copolymer (40% in xylene; tg = 78° C.) | 15 parts |
| Polyethylmethacrylate (tg = 63° C.) | 5 parts |
| Polyvinylacetate (50% in ethanol) | 4 parts |
| $SiO_2$ | 2 parts |
| $TiO_2$ | 6 parts |

Deposition of the Cholesteric Liquid Cristalline Layer

The cholesteric mixture is very viscous at room temperature. To enable processing, the mixture is dissolved in a solvent. Chlorobenzene is a solvent that gives good results. A balance has to be found between solvent properties like wetting, compatibility with the polyimide and evaporation rate. A 50%–66% solution is used. The detailed composition of the solution is:

$$\left.\begin{array}{l} 0.9 \text{ wt \% Darocure 4265} \\ 300 \text{ ppm } HME \\ 13.5 \text{ wt \% methylmenthone} \\ 85.5 \text{ wt \% } RM258 \end{array}\right\} 66 \text{ wt \% in chlorobenzene}$$

This solution is deposited in a web-coating process onto the carrier by doctor blade coating. There are several reasons for choosing blade coating. With respect tot he amount of material necessary for deposition of a layer, this technique is much more efficient than spincoating. Another reason is that the evaporation of the solvent proceeds slowly. By fast evaporation of the solvent the cholesteric structure is easily quenched into a metastable structure.

However, it was found that spincoating from xylene is also feasible and more or less the same composition of the solution can be used. Immediately after blade coating (no evaporation step), the laminate is irradiated through a chromium patterned mask with ORC UV exposure equipment (Optibeam, intensity ca. 20 mW/cm$^2$). In this stage the layers may still contain solvent. The mask contained areas that were fully transparent to UV light, areas that reflected UV light and areas that were partially covered (50%–60%) by chromium (random dot patterns). The required UV dose is ~250 mJ/cm$^2$(~10–20 sec. exposure).

Cholesteric Liquid Crystals

The cholesteric liquid crystalline phase is a chiral mesophase with a natural periodicity. The liquid crystals are arranged in a screwlike fashion. Depending on the materials, the periodicity can vary from fifty nanometer to many micrometers. An interesting phenemenon occurs when the periodicity of the cholesteric liquid crystals matches the wavelength of light in the material. In such a case the light will be reflected (Bragg reflection). The physical background of this effect it related to that of interference filter. Depending on the handedness of the cholesteric liquid crystals either left-handed or right-handed circularly polarized light will be reflected. Cholesteric layers will normally reflect only light with wavelengths between pxn$_e$ and pxn$_o$, where n$_e$ and n$_o$ are the extraordinary and the ordinary refractive indices of a uniaxially oriented phase, respectively. In practice, this means that the width of the reflection band is restricted to values between 20 and 100 nm. However, recently a number of measures have become available to either narrow or widen the reflection band.

For the pattering of cholesteric liquid crystals thermochromism is a property that can be exploited. The reflection color of cholesteric materials changes with temperature. By crosslinking at different temperatures e.g. R, G, B patterns can be obtained. The problem with this approach is that three mask exposure steps (at elevated temperature) have to be used and that the temperature control has to be very tight.

A preferred method is based on photosensitive cholesteric materials. For these materials the periodicity of the cholesteric phase can be influenced by UV light. For example, by exposing a cholesteric layer with a blue reflection to UV light, the color will gradually change from blue to green to red. Using these materials a process for producing a R, G, B pattern is the following. First a cholesteric layer which shows a blue reflection is deposited on a substrate. Then the layer is patternwise exposed to UV light with a grey scale mask. The areas that are irradiated with a high light intensity will change from blue to read, the areas that are irradiated with a intermediate light intensity will change from blue to green, and the areas that receive only a very small or no light dose will remain blue. In this process only one exposure step is necessary to generate the colors. This is a strong reduction compared to the three mask exposure steps that are required in the thermochromism based process. An important issue is the stabilization of the produced pattern. The cholesteric layer should be stable against prolonged UV exposure. This means that after generation of the color pattern the cholesteric layer has to be crosslinked. This imposes various requirements on the materials. These will be discussed hereafter.

The Photosensitive Chiral Dopant

To change the periodicity of the cholesteric liquid crystalline phase the structure of the chiral dopant has to be modified. Chiral molecules are added to liquid crystals to control the twisting sense and the rotation angle or periodicity of the layer. The distance over which the molecules rotate 360° is called the pitch (P). The effectiveness of chiral molecules to rotate the liquid crystals is given by the helical twisting power $$(HTP): HTP = \frac{1}{Pxc}$$

in which c represents the concentration of the chiral molecule. The HTP is known to be strongly dependent on the conformation and chemical structure of the chiral liquid crystal. When the conformation or the chemical structure of the molecules is changed by light, the HTP of the molecules will also be influenced. For instance, photodegradation of the chiral groups can be used to manipulate the HTP of chiral compounds. Recently, the photoracemization of binaphtyl derivatives was demonstrated. In this process optically active molecules are converted by intense UV irradiation to racemic mixtures of the isomers with no net HTP. At the moment photoisomerization is the most preferred method to influence the helical twisting power of chiral dopants. For most photoisomerizable chiral compounds the E and the Z isomers will have different helical twisting powers. The photoisomerizable compound should:

be transparent for visible light
be nearly transparent for 365 nm (avoid UV gradients)
be stable between 0 and 250° C.
be none-reisomerizable (between 0 and 250° C.)
be soluble in sufficiently high quantities in the liquid crystal host at RT
have a high helical twisting power
have large changes in helical twisting power during irradiation
cause no destabilization of LC phase during irradiation
be polymerizable
preferably be a diacrylate (low amounts of extractable material after crosslinking, higher thermal stability)

The menthone derivatives are molecules that fulfill most of these demands. The molecules are transparent for visible light and soluble in many liquid crystalline hosts. Their HTP is attractive, because reflection of visible light can be achieved with low concentrations of chiral material. The irradiation gives rise to large changes in HTP that are stable for prolonged periods of time. The materials give a left-handed helix. Several menthone derivatives were synthesized, a.o. methyl-methone derivatives.

The molecules can contain the following chemical building blocks: a chiral unit to induce the cholesteric phase, an isomerizable unit to incorporate the photosensitivity, an LC unit to increase the compatibility with the liquid crystal host, a polymerizable unit to enable the incorporporation of the molecule in a polymet network, and a spacer unit to minimize the influence of the polymerization on the orientation of the liquid crystal unit.

The menthones appear to be suitable compounds for the UV light induced structuring of cholesterics. A preferred material is methylmenthone. This material can be incorporated in networks and crystallizes more slowly than the other acrylate derivatives of menthone.

The Liquid Crystalline Host

In order to stabilize the patterned layers a crosslinkable host is needed. Several additional demands can be formulated for the host Broad nematic temperature range (preferable 0–150° C.)
Transparent for wavelengths larger than 350 nm
Low viscosity
Soluble in solvents
Planar alignment (at the substrate but also at the air-LC interface)
Chemically stable between 0 and 250° C.
Mechanically stable (high crosslink density, high $T_g$ etc.)
The mixture should preferably contain only diacrylates Several suitable hosts have been found. The first one is a host developed by Merck (UK). The commercial name is RM258. This host consists of a mixture of liquid crystalline diacrylates. The melting point is ~55° C. and the clearing point is 119° C. The mixture can be dissolved in a range of solvents (chlorobenzene, cyclohexanone, dischlorobenzene, chloroform, xylene).

An alternative mixture is KDA. This is a single compound. The melting point and the clearing temperature are 54° C. abd 140° C., resp. The glass transition is −17° C.

It is noted that the materials described in European Patent Application EP 99/09711 (=PHN 17.592) can be advantageously used in the present invention.

Cross-linking

The crosslinking (curing) of the photosensitive systems can be achieved by thermal crosslinking but UV-induced crosslinking and e-beam crosslinking are more preferred.

E-beam Cross-linking

In contrast to UV crosslinking no photoinitiator is required for electron beam crosslinking. In the first step the color patterns are generated using 365 nm UV light and in the second step the patterns are stabilized by irradiating the layers with electrons. The electrons generate radicals in the mixture and the polymerization is started.

The mixture consisted of 15% methylmenthone and 85% RM258. in order to generate color patterns the layer was irradiated with UV light in an ambient atmosphere. The E-beam polymerization was performed in a nitrogen atmosphere. Typical conditions of the E-beam: 175 kV, 3–7 mA, 12 m/min., 25–80 kGy. The layers were quite scratch resistant.

UV-induced Cross-linking.

It is difficult to avoid interference of the patterning and the crosslinking. Two methods have been designed that decouple these processes to some extent:

A. UV-exposure combined with a heating step
B. UV cross-linking with longer wavelengths (double exposure). In the near visible range the rate of isomerization strongly decreases by increasing the wavelength. When menthone is exposed to 405 nm UV light hardly any isomerization occurs.

This means that the crosslinking can be performed without changing the colors.

A mixture of 15% methylmenthone, 83.5% RM258, and 1.5% Darocure 4265 was exposed at room temperature to 365 nm UV light. The desired colors could be obtained. In the second step the layers were exposed at room temperature in a nitrogen atmosphere to 405 nm light. The layers could be cured without influencing the colors.

Some remarks:

It is possible to control the reflection of the cholesteric layer from specular to diffuse by introducing defects in the structure.

It appears to be feasible to make region-wise a broad band reflector (metallic appearance).

It is possible to incorporate dyes in the layer. In this way the flexibility for the background color is improved.

To enhance the stability and resistivity of the coating a topcoat can be supplied on the coating.

Irradiation with UV light with varying intensities on different locations of the surface of the cholesteric layer produces a surface with a (multi) color pattern. If the intensities vary in the depth direction of the cholesteric layer holographic information or 3D information can be "imaged". This leads to interesting application possibilities, in particular in combination with the in-mould decoration process step.

Used in this way, the invention provides e.g. a plastic article (an identification card or the like), onto a surface of which a region-wise optically modified (patterned) cholesteric liquid crystalline layer has been transferred which comprises a holographic image. Also non-transfer applications where a region-wise patterned cholesteric liquid cristalline layer which comprises a holographic image is used, can be very advantageous.

Summarizing the invention relates to a method of providing a decorative coating or text or the like on articles, like shavers, GSM's, (identification) cards etc. The coating comprises a region-wise optically modified (patterned) cholesteric liquid crystalline layer, which is transferred onto a surface of the article by means of a transfer operation. The so-called in-mold decoration technique has been found to be very advantageous for the transfer of decorative (patterned) cholesteric liquid crystalline layers. In this technique the layer is (releasably)deposited on a plastic carrier foil and provided with a layer of adhesive. The assembly is inserted in an injection mold before the injection molding of polymer material starts. In this way decorative coatings (e.g. multi color images) and texts or the like can even be applied onto, non-even and slightly curved substrates.

What is claimed is:

1. Method for providing a surface of an article with a decoration or text, comprising:

transferring at least a region-wise optically modified cholesteric liquid crystalline layer having a cholesteric reflection band onto the surface of the article in a transfer operation; and region-wise modifying the cholesteric reflection band by exposure to UV radiation.

2. Method as claimed in claim 1, in which the liquid crystal layer is transferred by means of a transfer foil which includes a carrier and the cholesteric liquid crystalline layer.

3. Method as claimed in claim 2, in which the cholesteric liquid cristalline layer is releasably disposed on the carrier.

4. A method as claimed in claim 1, in which the decoration is a holographic image.

5. Method for providing a surface of an article with a decoration or text, comprising transferring at least a region-wise optically modified cholesteric liquid crystalline layer having a cholesteric reflection band onto the surface of the article in a transfer-operation, in which the region-wise modification of the cholesteric reflection band has been followed by a curing treatment of the cholesteric layer.

6. Method for providing a surface of an article with a decoration or text, in which at least a region-wise optically modified cholesteric liquid crystalline layer is transferred onto the surface of the article in a transfer operation, the liquid crystal layer is transferred by means of a transfer foil which includes a carrier and the cholesteric liquid crystalline layer, and the transfer foil is arranged into an injection mold which has the form of the article and that a polymer melt is injected into the mold at elevated temperature.

7. A method as claimed in claim 6, in which the transfer foil comprises a carrier foil on a surface of which are arranged a release layer, the cholesteric liquid crystalline layer, and an adhesive layer.

8. A method for providing a surface of an article with a decoration or text, in which at least a region-wise optically modified cholesteric liquid crystalline layer is transferred onto the surface of the article in a transfer operation, and the material of the layer cholesteric liquid cristalline is oriented in such a way that the axis of the molecular helix of the cholesterically ordered material extends transversely to the layer, wherein the method comprises the steps of:

providing a layer of a cholesterically ordered material comprising a quantity of a convertible compound which in its non-converted and in its converted state determines the pitch of the cholesterically ordered material to a different extent, in which the conversion of said compound may be induced by radiation, irradiating the layer in accordance with a desired pattern so that at least a part of the convertible compound in the irradiated parts of the layer is converted, polymerizing and/or crosslinking the cholesterically ordered material to form a three-dimensional polymer.

9. A method as claimed in claim 8, characterized in that the irradiation is performed such that the irradiation dose is different for at least two different areas of the layer.

* * * * *